United States Patent
Bienas et al.

(10) Patent No.: US 11,528,051 B2
(45) Date of Patent: *Dec. 13, 2022

(54) REUSE OF TRANSMISSION RESOURCES FOR DEVICE TO DEVICE COMMUNICATION

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,979

(22) Filed: Nov. 18, 2020

(65) Prior Publication Data

US 2021/0075467 A1 Mar. 11, 2021

Related U.S. Application Data

(63) Continuation of application No. 16/323,843, filed as application No. PCT/EP2017/070475 on Aug. 11, 2017, now Pat. No. 10,873,362.

(30) Foreign Application Priority Data

Aug. 16, 2016 (EP) .................................... 16184353

(51) Int. Cl.
*H04W 72/04* (2009.01)
*H04B 1/7107* (2011.01)
(Continued)

(52) U.S. Cl.
CPC ......... *H04B 1/7107* (2013.01); *H04B 17/345* (2015.01); *H04L 1/0038* (2013.01);
(Continued)

(58) Field of Classification Search
CPC ... H04B 1/7107; H04B 17/345; H04J 11/004; H04L 1/0038; H04L 27/0012;
(Continued)

(56) References Cited

U.S. PATENT DOCUMENTS

| 9,084,203 B2 | 7/2015 | Madan et al. |
| 9,560,574 B2 | 1/2017 | Chatterjee et al. |

(Continued)

FOREIGN PATENT DOCUMENTS

| CN | 104105181 A | 10/2014 |
| EP | 2986061 A1 | 2/2016 |

(Continued)

OTHER PUBLICATIONS

International Search Report for International Application No. PCT/EP2017/070475, dated Sep. 20, 2017.

(Continued)

*Primary Examiner* — Frank Duong
(74) *Attorney, Agent, or Firm* — Marshall, Gerstein & Borun LLP (57) ABSTRACT

The present invention provides a method of determining a transmission power for device to device, D2D, transmissions between a first user equipment device and a second user equipment device using transmission resources being used for transmissions to a cellular network entity by a third user equipment device, the method comprising determining a measure of a path loss between the cellular network entity and the first user equipment device, and using the measure of the path loss to determine a maximum transmission power such that the D2D transmissions are received at the cellular network entity with a signal level around or below a noise level.

9 Claims, 5 Drawing Sheets

(51) Int. Cl.

| | |
|---|---|
| *H04L 1/00* | (2006.01) |
| *H04W 52/24* | (2009.01) |
| *H04W 52/36* | (2009.01) |
| *H04W 88/06* | (2009.01) |
| *H04B 17/345* | (2015.01) |
| *H04W 76/14* | (2018.01) |
| *H04L 27/00* | (2006.01) |
| *H04W 52/38* | (2009.01) |
| *H04W 72/02* | (2009.01) |
| *H04W 4/70* | (2018.01) |
| *H04W 88/02* | (2009.01) |
| *H04J 11/00* | (2006.01) |
| *H04W 16/14* | (2009.01) |

(52) U.S. Cl.
CPC .......... *H04L 27/0012* (2013.01); *H04W 4/70* (2018.02); *H04W 52/242* (2013.01); *H04W 52/243* (2013.01); *H04W 52/367* (2013.01); *H04W 52/383* (2013.01); *H04W 72/02* (2013.01); *H04W 72/0473* (2013.01); *H04W 76/14* (2018.02); *H04W 88/023* (2013.01); *H04W 88/06* (2013.01); *H04J 11/004* (2013.01); *H04W 16/14* (2013.01)

(58) Field of Classification Search
CPC ....... H04W 4/70; H04W 16/14; H04W 52/24; H04W 52/242; H04W 52/243; H04W 52/36; H04W 52/367; H04W 52/383; H04W 72/02; H04W 72/04; H04W 72/0473; H04W 76/14; H04W 88/02; H04W 88/023; H04W 88/06
See application file for complete search history.

(56) References Cited

U.S. PATENT DOCUMENTS

| | | | |
|---|---|---|---|
| 9,749,966 B2* | 8/2017 | Lindoff | ............... H04W 52/243 |
| 9,847,848 B2 | 12/2017 | Ryu et al. | |
| 9,942,013 B2 | 4/2018 | Malladi et al. | |
| 10,003,486 B2 | 6/2018 | Zhu et al. | |
| 10,021,654 B2 | 7/2018 | Kim et al. | |
| 2010/0006909 A1 | 1/2010 | Brady | |
| 2013/0310103 A1 | 11/2013 | Madan et al. | |
| 2014/0087744 A1* | 3/2014 | Yang | ..................... H04W 76/23 |
| | | | 455/450 |
| 2014/0233476 A1 | 8/2014 | Kwak et al. | |
| 2015/0018001 A1 | 1/2015 | Kim et al. | |

FOREIGN PATENT DOCUMENTS

| | | |
|---|---|---|
| WO | WO-2015009025 A1 | 1/2015 |
| WO | WO-2015171422 A1 | 11/2015 |

OTHER PUBLICATIONS

Written Opinion for International Application No. PCT/EP2017/070475, dated Sep. 20, 2017.
Chen Xu, et al.: "Resource Management for Device-to-Device Underlay Communication Contents", Cornell University Library, Nov. 5, 2013, pp. 1-84, XP055243452, URL: http://arxiv.org/pdf/1311.1018v1.pdf, Jan. 21, 2016.
Ericsson et al: "Path Loss Measurement for UL Power Control in Carrier Aggregation", 3GPP Draft; R4-101941 Path Loss Measurement for UL PC, 3rd Generation Partnership Project (3GPP), Mobile Competence Centre; 650, Route Des Lucioles; F-06921 Sophia-Antipolis Cedex; France, vol. Ran WG4, No. Montreal, Canada; May 10, 2010, May 20, 2010.
Dai et al, Non-Orthogonal Multiple Access for 5G: Solutions, Challenges, Opportunities, and Future Research Trends, IEEE, 8 pages, Sep. 2015.
Ding et al, Application of Non-orthogonal Multiple Access in LTE and 5G Networks, arXiv, 16 pages, Nov. 2016.
Wang et al, Analysis of Non-Orthogonal Multiple Access for 5G, China Communications, 15 pages, 2016.
English Translation of the First Office Action for Chinese Application No. 201780050091.1, dated Jul. 13, 2021.
European Search Report for Application No. 21197903.4, dated Jan. 7, 2022.

* cited by examiner

REUSE OF TRANSMISSION RESOURCES FOR DEVICE TO DEVICE COMMUNICATION

CROSS-REFERENCE TO RELATED APPLICATIONS

This is a continuation of U.S. application Ser. No. 16/323,843, filed Feb. 7, 2019, which is the United States national phase of International Patent Application No. PCT/EP2017/070475, filed Aug. 11, 2017, which claims priority to European Patent Application No. 16184353.7, filed Aug. 16, 2016, the entire contents of each of which are hereby incorporated herein by reference.

FIELD OF THE DISCLOSURE

The present invention relates to techniques for implementing device-to-device (D2D) communication in a mobile communications system in which non-orthogonal multiple access (NOMA) communication is enabled.

Current mobile communication systems like GSM, UMTS, HSPA and LTE use orthogonal radio resources to distinguish signals from and to different users. That means, that each user obtains a set of individual resources for exclusive usage so that signals sent by different users on these different set of resources do not interfere with each other. A resource is a certain portion of the frequency spectrum at a certain instance in time. In case of LTE, a resource may be represented by a resource block made up of twelve sub-carriers and seven OFDM symbols (or multiples/fractions thereof).

In addition to conventional cellular communication between a base station (eNB) and mobile devices (UE), 3GPP has defined a direct device-to-device (D2D) communication mode for the LTE System. The related interface between two devices in D2D mode is called PC5 or "sidelink". The resources used for D2D communication mode are shared with the resources for cellular communication mode. I.e. the amount of resources and therefore the throughput in cellular communication mode is reduced in case of simultaneous use of D2D communication.

A new multiple access technology is currently studied at 3GPP within the study item "Downlink Multiuser Superposition Transmission for LTE" (MUST)". One proposed solution for this study is called "Non-orthogonal Multiple Access". The key principal is that the same resources are assigned to multiple users or multiple data streams and are used simultaneously. Different users or data streams are distinguished in the power domain. The study aims to increase the cellular throughput and does not consider D2D communication.

Received data of each user or a data stream from the same NOMA resources has to be decoded successively starting with the signal received with highest power. After that, this portion of the signal is subtracted from the received signal and the receiver decodes the user data or data stream received with the second highest received power from the remaining signal, and so on until all data relevant for the receiver from this resource are decoded. This method postulates that information about the different power levels used for transmission is known at the receiver.

It is the aim of the present invention to use a modified NOMA principle to simultaneously provide cellular communication and D2D communication on the same set of resources without limiting the cellular resources and without effecting the cellular system by the D2D communication, thereby providing a full throughput in the cellular system while simultaneously D2D communication is provided.

In addition to documents submitted to 3GPP relating to NOMA, US WO 2015/171422 A1 describes the usage of NOMA in a cellular system including uplink, downlink and device-to-device transmission. Interference elimination is described for the uplink and downlink bands but not the suppression of interference from simultaneous operation of the cellular system and device-to-device communication.

Current cellular communication systems, such as 3GPP LTE, assume that (at least) two distinct resource pools exist to separate direct communication between mobile devices from cellular communication between mobile device(s) and a base station. Up to now it is not specified how to enable usage of occupied cellular resources for direct device-to-device communication (i.e. how to use the same set of resources) without causing interferences to the cellular connection.

The known NOMA principle assumes that either a single transmitter is transmitting multiple signals with different power levels by using the same resources, or that a single receiver is receiving multiple signals with different power levels by using the same resources, i.e. a one-to-many or a many-to-one scenario is assumed.

US 2014/0233476 A1 describes a device to device (D2D) communication system in which special sub-frames are used for D2D transmissions. Transmission power may be controlled such that a base station does not experience signal degradation when a D2D transmission is received together with a transmission from another UE. A UE operating in a D2D mode may receive transmit power information from the base station. A path loss measurement between a transmitting D2D UE and a receiving D2D UE is obtained by using reference signals and this information is exchanged between the UEs.

US 2013/0310103 A1 describes a method for D2D power control in which a base station transmits power control information which a UE uses to determine a maximum D2D transmit power.

A book entitled "Resource Management for Device-to-Device Underlay Communication" by Chen Xu, Lingyang Song and Zhu Han, arXiv:1311.1018v1 describes a D2D scheme which relies on feedback from an eNB for transmit power control.

US 2010/006909 A1 describes a method of uplink power control where a UE calculates a maximum uplink transmit power from a downlink path loss measurement.

WO 2015/009025 A1 describes techniques for interference cancellation in a D2D system in which blind detection is used to obtain interference signal information which is then used to remove an interfering signal from a desired signal The present invention provides a method of determining a transmission power for device to device, D2D, transmissions between a first user equipment device and a second user equipment device using transmission resources being used for transmissions to a cellular network entity by a third user equipment device, the method comprising determining a measure of a path loss from the cellular network entity to the first user equipment device, and using the measure of the path loss to determine a maximum transmission power such that the D2D transmissions are received at the cellular network entity with a signal level around or below a noise level, wherein the determining of the maximum transmission power includes using a correction value for compensating for a difference between the measured path loss from the cellular network entity to the first user equipment device and a path loss from the first user equipment device to the cellular network entity.

A method that enables mobile devices with D2D capabilities to use resources for direct device-to-device (D2D) communication which are already in use (by the same or other devices) for cellular communication without disturbing the cellular connection is provided. The principles of NOMA with interference cancellation may be applied such that no or little impact is caused to the cellular network and to cellular devices.

Further, the invention provides a method for a cellular network to assign identical resources several times simultaneously to different devices for simultaneous use for cellular transmissions and direct device-to-device transmissions.

In a still further aspect, the invention provides a method to enhance short range communication receivers (e.g. Wi-Fi or Bluetooth) to eliminate interferences from LTE uplink transmissions.

The invention provides the benefit that a mobile device with D2D capabilities is enabled to derive a maximum allowed transmit power for the direct D2D communication from the downlink reference signals transmitted by the "strongest" base station (i.e. the base station that is received with highest power). This is beneficial, as it avoids that any interference is caused by the D2D transmission to the cellular transmission and because no additional signalling is required.

A further benefit is that the D2D device is enabled to decode and remove interfering signals from other mobile devices' cellular uplink transmissions without explicit signalling about used modulation scheme, i.e. a method for blind interference cancellation is provided. This is done by using reference signals that were already transmitted with every transmission by the interfering device. This is beneficial, as it saves costly cellular resources, i.e. as no additional cellular resources for such signalling are required. Besides applying this blind interference cancellation method to enable D2D communication, it could be used in any receiver to eliminate LTE uplink based interferences and therefore to increase the reception quality and data throughput of own data. E.g. WiFi- or Bluetooth devices that operate close to an LTE band.

An eNB is enabled to select resources for D2D communication based on their suitability, according to one or more of the following properties:

a low order modulation scheme is assigned to the cellular uplink transmission (e.g. QPSK and probably 16-QAM, but not 64-QAM or 256-QAM. This limitation reduces the calculation effort to estimate each of the transmitted interfering symbol.)

the channel characteristic of the cellular link is (more or less) persistent (e.g. because the respective UE is stationary). In this case the calculated parameters for interference cancellation could be re-used and thus effort for new calculation is saved.

the transmit power used for the cellular transmission is medium to high. This increases the reliability to correctly detect and remove the interfering signal portion and increases the range of the D2D transmission.

These channel persistency property qualifies stationary cellular devices like "relay nodes", "cellular home network router" or "utility meters" (e.g. smart meters), to obtain cellular uplink resources that are simultaneously used by D2D devices.

Applying the method for resource assignment is beneficial for the network operator, as the cellular resources are used more efficiently and therefore the overall system throughput and the user experience is increased.

BRIEF DESCRIPTION OF THE DRAWINGS

Embodiments of the invention will now be described, by way of example only, with reference to the accompanying drawings in which.

DETAILED DESCRIPTION

Figure 1:
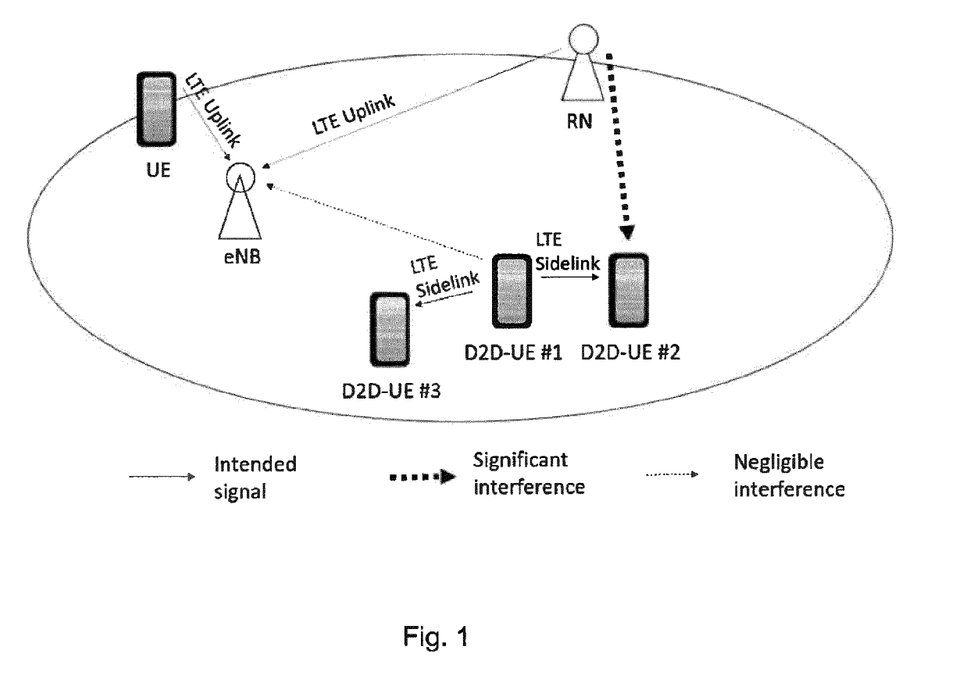
FIG. 1 shows a communication scenario including D2D communication.

The following description assumes a communication system according to LTE. FIG. 1 shows an assumed scenario. However, the principles of the present invention shall not be restricted to LTE systems.

Figure 5:
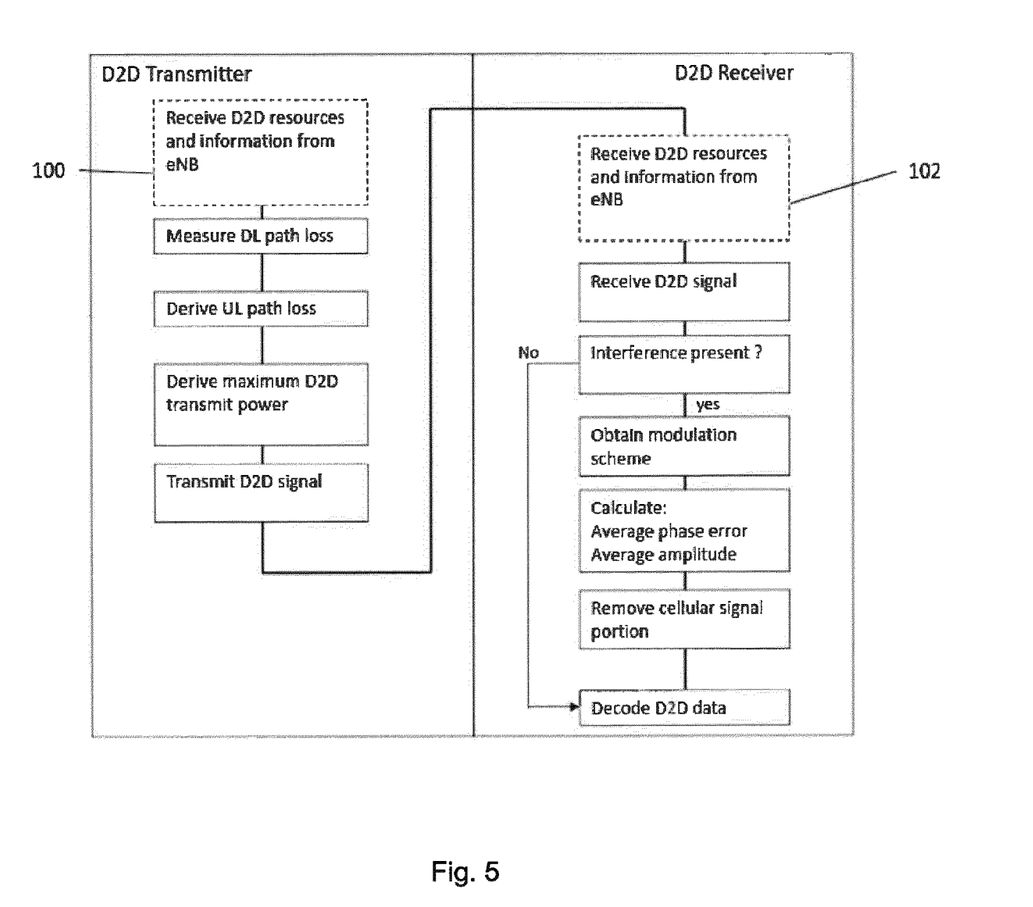
FIG. 5 a division of steps between a D2D transmitter and a D2D receiver.

The following is a description of interference cancellation describing steps for transmitting and receiving D2D-UE (or short range receiver) and eNB, respectively. The particular steps are depicted in FIG. 5.

Figure 2:
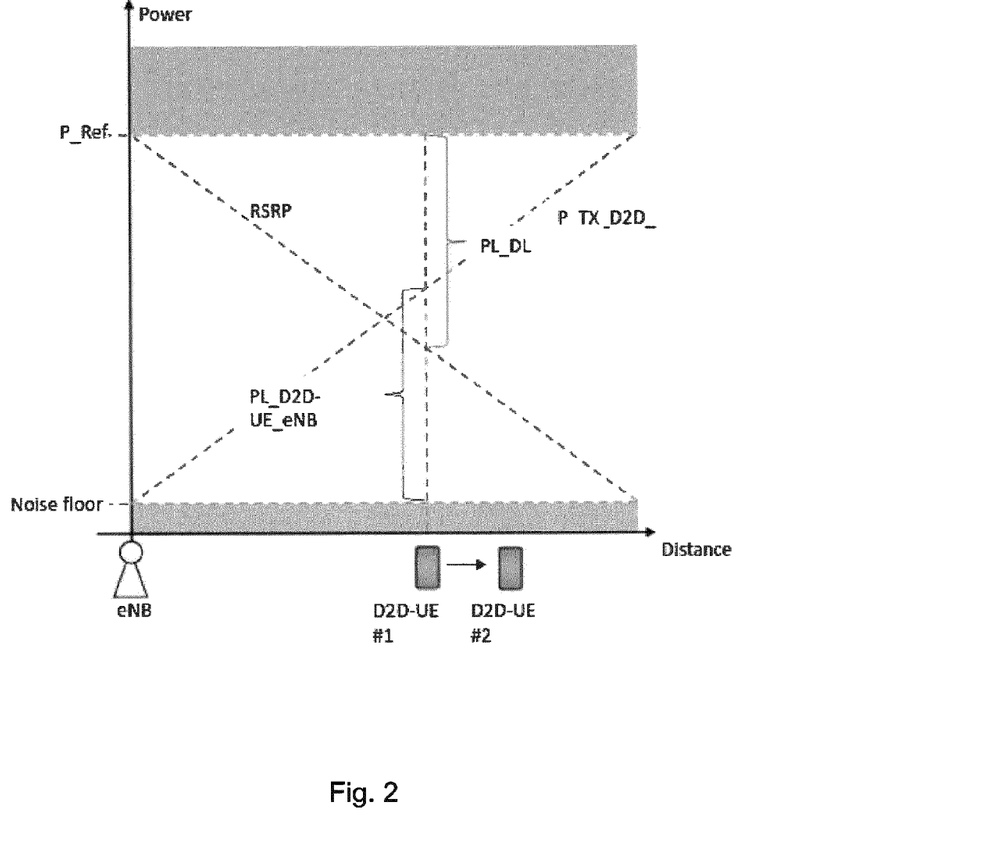
FIG. 2 illustrates a relationship between distance, reference signal power and maximum D2D transmit power.

A first aspect of the invention, that of deriving a maximum power for D2D transmission, is illustrated by FIG. 2.

A basic aim of the present invention is to avoid interference in the resources of the cellular system, when direct device-to-device communication takes place in the same resources. The method of choice to achieve this objective is NOMA where devices or data streams can be distinguished from one another by means of different power levels. As no additional signalling should be introduced between UEs/D2D-UEs and the base station, a maximum D2D transmit power has to be obtained or derived by the transmitting D2D devices themselves. The transmit power value is chosen in such a way that interference at the cellular receiver is around or below the typical noise level, which is not harmful for the cellular connection. It is assumed in the following embodiments, that the LTE uplink resources are used for D2D communication, i.e. the LTE uplink band in case of FDD or the LTE uplink sub-frames in case of TDD. The eNB is therefore the receiver of the cellular signals that are to be protected from interference caused by D2D communication.

The maximum D2D transmit power (P_Tx_D2D_max) strongly depends on the path loss of the D2D signals to the eNB (PL_D2D–UE_eNB) illustrated in FIG. 2. A relationship between maximum transmit power and path loss can be expressed as follows:

$$P\_Tx\_D2D\_max = PL\_D2D-UE\_eNB + \text{noise floor}$$

In order to avoid any change to the cellular system, it is not desirable to derive this path loss directly, as it requires additional procedures in the eNB.

Alternatively, the path loss of the D2D signals as experienced by the eNB (i.e. in uplink direction) could be estimated from the path loss of the opposite direction, i.e. the downlink path loss. It is almost the same, in case the used frequency bands are identical (as in case of TDD Mode). If they are different (e.g., in case the cellular system is an FDD system and D2D operates in the UL frequency band of the cellular system), a correction value could be applied. The correction value might be configurable and depend on the gap between UL and DL band on the frequency scale (further details of this are given below).

Therefore, the transmitting D2D UE calculates the downlink path loss (PL_DL) from the reference signals transmitted by the eNB (reference signal received power, RSRP) and the transmit power of these reference signals (P_Ref) which is broadcasted by the eNB. It calculates the maximum D2D transmit power P_Tx_D2D_max as follows:

$$P\_Tx\_D2D\_max = P\_Ref - RSRP + P\_correct - P\_offset$$

Wherein:

P_Ref is the transmit power of the downlink reference signals as indicated in the system information;

RSRP is the measured power of the downlink reference signals at the D2D UE;

P_correct is the correction value to compensate the path loss difference of uplink versus downlink (e.g., in an FDD system where UL and DL bands are separated on the frequency scale by a gap). This value could be taken from a list of values stored on the D2D device. Different values are stored for different uplink/downlink band constellations. Or it could be calculated by the D2D device with the following formula:

$$P\_correct = 30 * \log 10(F\_D2D/F\_DL)$$

where F_D2D is the carrier frequency used for D2D transmission and

F_DL the Downlink Carrier Frequency;

P_offset is a power offset value to ensure that the received interference power is slightly below the noise floor.

No new measurements in the eNB are required for this calculation and no new signalling is therefore needed.

A further aspect of the invention is that of enabling a D2D receiver to reduce interference from uplink transmissions as will now be described.

The following provides a description of a procedure designed for a D2D-receiver to eliminate interferences from LTE uplink transmissions. It could also be used in any other kind of receiver that is affected by interferences from LTE uplink transmissions, e.g. in Wi-Fi or Bluetooth receivers.

According to the underlying assumption of this invention, direct device-to-device communication may simultaneously take place on the same resources that are allocated for cellular uplink transmissions. It is therefore necessary for a proper reception of D2D related data, that the receiving D2D terminal first reduces or eliminates interference caused by the cellular uplink transmission before decoding its own data is possible.

Interference from cellular transmissions is not present in all cases. It may be, that the resource in question is currently un-used in the cellular uplink or that the UE causing interference is far enough away from the D2D receiver and thus the interference power is negligible.

In one embodiment, the receiving D2D device verifies a presence of interference before starting interference cancellation, by measuring the received power in the relevant frequency spectrum. The D2D signal includes one or more gaps in the signal to enable such interference measurements. If the measured energy is above a threshold, interference is present. If no significant interference is detected interference cancellation is not performed and the D2D UE starts decoding its own data immediately.

Figure 4:
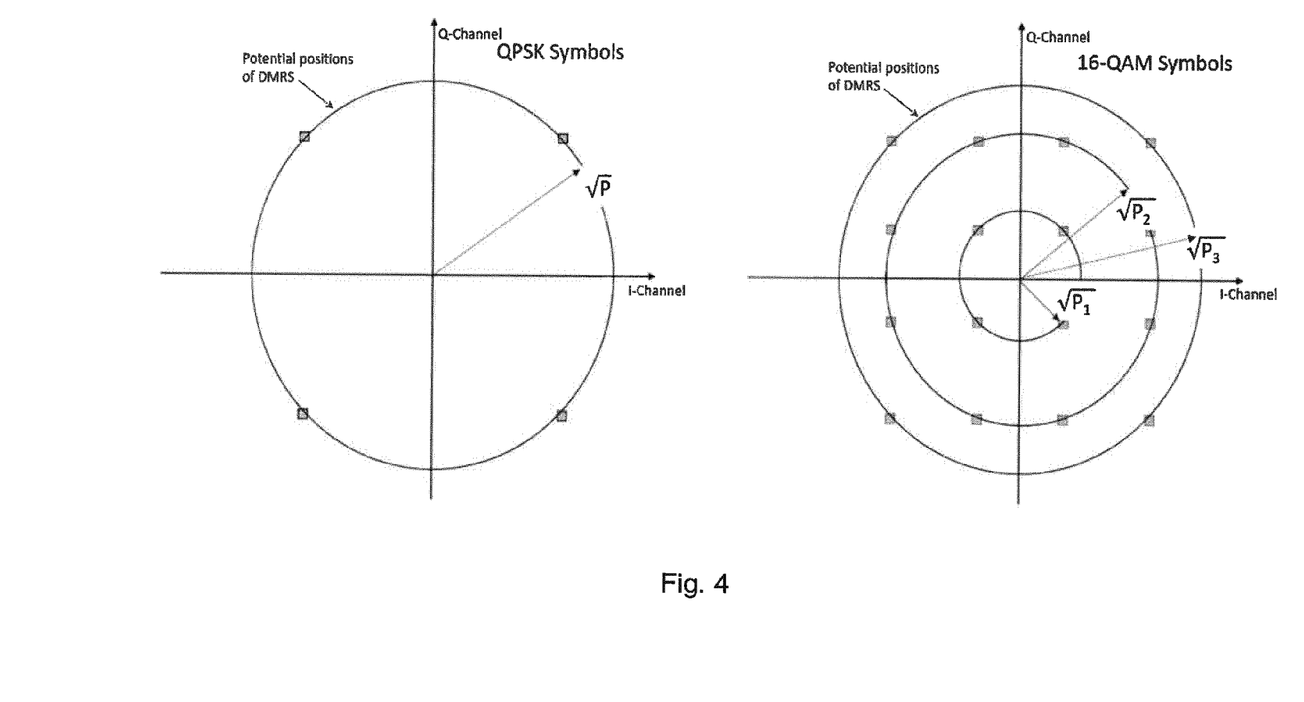
FIG. 4 shows a relationship between symbols and power levels for QPSK and 16-QAM transmissions.

In case interference is detected or the verification was not performed, the D2D UE starts interference cancellation. For that it is required to obtain the modulation scheme applied by the interfering UE:

In one embodiment, the receiving D2D UE applies a blind modulation scheme detection. To detect the modulation scheme, it measures per sub-carrier a received interference power by evaluating demodulation reference signals (DMRS) transmitted by the interfering UE. For this it is not required to exactly know the reference symbols actually being used, as the normalised amplitude of all used symbols is 1 and therefore it is sufficient to measure the energy of these reference symbols. They are located in each slot in OFDM-Symbol #3 (Note: the symbol count starts with 0) in case of normal cyclic prefix and #2 for extended cyclic prefix. Then it selects the sub-carriers whose reference signal power is above a threshold e.g. the 10 strongest subcarriers (assuming 10 subcarriers are above the threshold). This ensures a low noise level and therefore a reliable decoding of the interfering signal. The D2D-UE normalises the signal power of each selected subcarrier, so that the reference signals of all selected subcarriers have the same amplitude. Now it verifies different hypotheses about the modulation schemes. It calculates the difference of the power of one assumed modulation scheme and the received data symbols (=error power). If the assumption was correct, the difference is zero for a time invariant channel. If the difference is above a threshold, most likely the assumption was wrong. Therefore, the D2D UE changes to the next modulation scheme to be verified and newly calculates the error power. If it is now below a threshold, the assumed modulation scheme is correct. Otherwise, the D2D UE repeats the steps of changing the assumed modulation scheme and calculating the error power accordingly, until it is below a threshold. This indicates the correct modulation scheme. In case of QPSK, only 1 power level value exists. In case of higher order QAM Modulation schemes, more than 1 exist, e.g. 3 for 16-QAM and even more for 64-QAM, etc. In FIG. 4 the symbols for QPSK and 16-QAM and the related symbol power levels are depicted. For calculation of the error power, the received symbol power is compared to all symbol power levels of the assumed modulation scheme and only the power level which is closest to the power level of the received symbol is considered for error power calculation.

If no modulation scheme was found, whose error power is below a threshold, the D2D UE may guess the modulation scheme. It starts with the modulation scheme with the lowest error power. The correctness of the guessing is proved after interference cancellation. In case the reference signals are detected or decoding of the user data in the remaining signal is possible, the guessing was correct. Otherwise interference cancellation is done again with another modulation scheme.

In another embodiment the eNB indicates the used modulation scheme to the receiving D2D UE, e.g. via broadcast or via dedicated signalling. This is the most reliable way but it is costly as it requires additional signalling from the eNB. The solution is advantageous in cases, where the applied modulation scheme is unchanged for a long time, e.g. in case the uplink resources were assigned to a Relay Node or a device which is known to be at a fixed position (e.g. a Router with LTE-based WAN).

In the next step, having determined the modulation scheme, the D2D UE performs interference cancellation. For that it first calculates a phase error of the interfering symbols by calculating a phase difference of the received interference symbols compared to the nearest symbol of the assumed modulation scheme. From these individual phase error values, the average phase error is calculated per subcarrier over a certain time window (e.g one sub-frame). The length of this time window can be selected by the receiving D2D device. Longer periods will lead to a more reliable interference cancellation on the cost of a longer delay for decoding the user data.

Then the D2D UE calculates the amplitude of the interfering symbols from the received DMRS. From these individual amplitude values, the average amplitude is calculated per sub-carrier over the time window.

With the found modulation scheme, the average phase error and the average amplitude from the reference symbols, the D2D UE rebuilds the signal portion of the cellular transmitter. This is done for each subcarrier individually, in order to better adapt to the frequency dependant phase error and attenuation. Then it removes the rebuilt signal portion from the received overall signal.

It is to be noted that the aim of the described interference cancellation method is to eliminate, as far as possible, the cellular portion of the received signal while keeping the D2D portion unchanged for subsequent demodulation and decoding. To ensure that the D2D signal is not eliminated together with the cellular signal, we assume slowly changing cellular channel properties and apply averaging over a certain time window. As a result, per sub-carrier a single value "average phase error" and a single value "average amplitude" are applied to all symbols within the considered time window. This averaging is done because more frequent correction, e.g. with symbol-wise values, would eliminate the phase and amplitude of the symbols containing the user data for the D2D UE.

The remaining signal is now ready for demodulation of the user data.

A further aspect of the present invention is that of providing a base station with a mechanism for selecting suitable D2D resources.

Again, the underlying assumption of this aspect of the invention is that the received D2D signal is overlaid by a signal from the cellular uplink. Therefore, interference cancellation has to be performed for proper decoding of the data transmitted over the direct device-to-device link. To find the appropriate parameters (i.e. the applied modulation scheme for coding and phase shift and attenuation of transmission channel of the interfering signal) is a costly procedure regarding processor resources and battery power and the mobile device will benefit from any means to reduce the effort of interference cancellation. The mobile network can provide assistance for interference cancellation by a sophisticated resource allocation scheme for D2D usage by selecting resources with good suitability for easy interference cancellation. This option is shown in FIG. 5 as blocks 100 and 102 with dashed lines in the transmitter and the receiver, respectively. The following parameters will reduce the burden of interference cancellation:

Low order modulation scheme of the interfering UL signal:
This reduces the calculation effort to estimate each of the transmitted interfering symbols.
Long-lasting transmission and time-invariant (persistent) transmission channel characteristics between the originator of the interfering signal and the receiving D2D-UE:
In this case the frequency of re-calculating parameters for interference cancellation can be reduced to save computation power.

High reception power of the interfering signal at the receiving D2D UE:
This increases the reliability to correctly detect and remove the interfering signal portion.

In one embodiment, enhancements are also proposed to be applied to the base station of the cellular communication system. In case of LTE, an exemplary eNB incorporating the invention may be enabled to select and assign resources for D2D-usage that provide capabilities for easy interference cancellation based on the above listed parameters. Therefore, the eNB is enabled to detect (almost) stationary mobile devices (as these usually hold time-invariant transmission channel characteristics), that have an ongoing uplink connection and are located at great distance from the eNB (e.g. close to the cell edge) and/or in proximity to the D2D-UE. This often leads to a high reception power of the interfering signal at the D2D UE, which will ensure reliable interference cancellation. The property of low mobility could be derived by the eNB either by monitoring the change over time of e.g. the signal strength or similar physical parameters in the uplink, or by obtaining the type of device of the according cellular uplink transmitter. Ideally suited are devices of type "Relay Node", "cellular home network router" or "utility meters" (e.g. smart meters), as they are typically mounted and therefore unmovable. Once the eNB has selected matching devices for assignment of resources that are also assigned to D2D usage, it will ensure constant (=long-lasting) resource locations (i.e. subcarrier numbers) and low modulation order of the related uplink for cellular transmissions.

Figure 3:
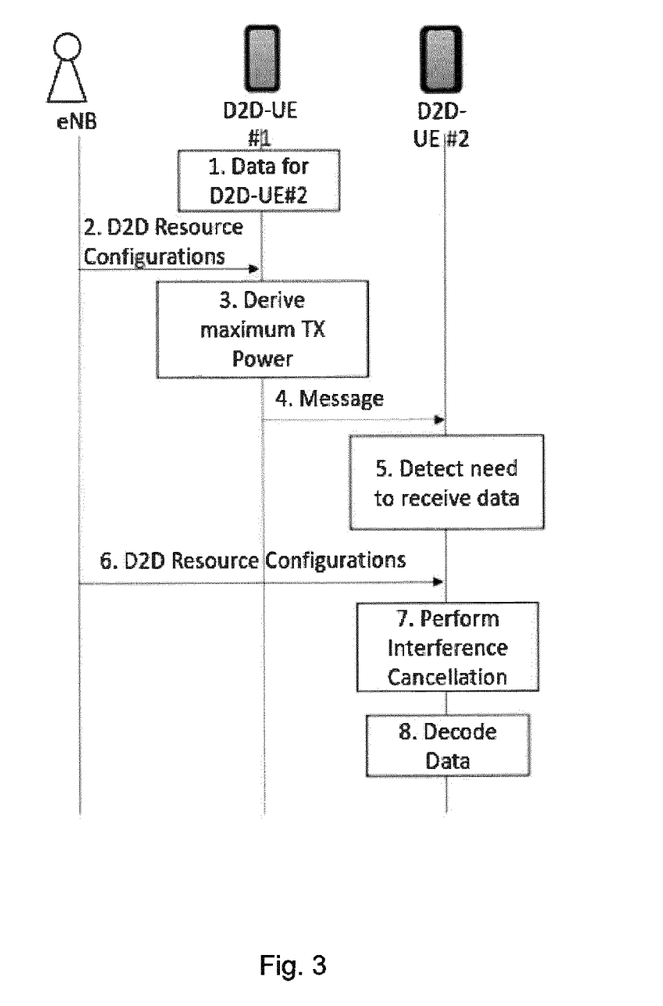
FIG. 3 shows an exemplary message flow chart.

An exemplary message flow for transmission and decoding of data in case that interference caused by transmitters in the uplink of an LTE-based cellular communication system has to be eliminated, is depicted in FIG. 3 and described in the following. For the sake of simplicity only one D2D-Receiver (D2D-UE #2) is shown. Nevertheless more than one receiver may receive the data. Such additional receivers will perform the same steps as D2D-UE #2. The numbering below corresponds to the numbering shown in FIG. 3.

1. D2D-UE #1 wants to transmit a message directly (via LTE sidelink) to D2D-UE #2
2. D2D-UE #1 obtains D2D resource configurations from eNB, including
   information about the nature of possible interference on the indicated D2D resource: "No interference. D2D transmission only" or "LTE Uplink based interference. Simultaneous D2D and cellular transmission"
   type of resource: "dedicated/congestion free" or "shared/congestion based"
   location of resources in frequency-time-grid (i.e. IDs of subcarriers and sub-frames)
   (optionally): applied modulation scheme of related uplink connections.

In this example, resources are assigned, which are simultaneously used for cellular uplink transmissions. Consequently, interference cancellation may be required for proper operation and D2D transmit power limitation have to be satisfied.

3. D2D-UE #1 derives maximum transmit power for D2D transmission according to the method to derive the maximum D2D transmit power described above.
4. D2D-UE #1 transmits a message to D2D-UE #2 using a transmit power which is below or around to the maximum transmit power. There may be other criteria that limit the transmit power in addition to that applied in step 3, i.e. regulatory obligations or hardware related obligations (e.g. maximum power provided by power amplifier).

D2D-UE #1 will ensure that none of the power limits are exceeded by the used transmit power.
5. D2D-UE #2 detects cause to receive D2D-signal. E.g. because it has received a corresponding paging signal previously.
6. D2D-UE #2 obtains D2D configuration data from eNB (cf. step 2 above)
7. D2D-UE #2 detects information about the nature of possible interference on the indicated D2D resource. As described in step 2, LTE uplink based interference is assumed. Therefore, D2D-UE #2 is removing interferences as described above in the method to decode and remove interfering signals. If the applied modulation scheme is included in the received D2D configuration data, it is used for Interference cancellation. Otherwise, blind modulation scheme detection or guessing of the modulation scheme is applied as described above in the method to decode and remove interfering signals.
8. D2D-UE #2 decodes the data indented for this device. In case decoding was unsuccessful, steps 7. and 8. may be repeated with a different assumption for the modulation scheme of the interference until decoding is successful.

Further aspects of the invention include a method of performing device to device, D2D, communication between a first user equipment device and a second user equipment device using transmission resources being used for transmissions to a cellular network entity by a third user equipment device, the method comprising performing a blind demodulation scheme for demodulating transmissions by the third user equipment device in order to perform interference cancellation to cancel signals received from the third user equipment device prior to demodulating signals received from the second user equipment device.

The method may be such that the blind demodulation scheme comprises evaluating demodulation reference signals transmitted by the third user equipment device.

A modulation scheme used by the third user equipment device may be determined by:
measuring a signal power of reference symbols of the reference signals for a plurality of sub-carriers,
selecting a predetermined number of sub-carriers having a reference signal power above a threshold;
applying an assumed demodulation scheme to the signals in these selected sub-carriers;
determining whether an error power is below a threshold in which case the related assumed demodulation scheme will be used for demodulation. If the error power is equal or above the threshold, a further assumed demodulation scheme is applied until an error power is below the threshold.

These blind detection methods may be combined with the power control aspects of the invention described above.

A further aspect of the invention provides a method of performing device to device, D2D, communication between a first user equipment device and a second user equipment device using transmission resources being used for transmissions to a cellular network entity by a third user equipment device, the method comprising performing a demodulation scheme for demodulating transmissions by the third user equipment device in order to perform interference cancellation to cancel signals received from the third user equipment device prior to demodulating signals received from the second user equipment device, the demodulation scheme having been communicated to the first user equipment device by the cellular network entity.

This method may be combined with the power control aspects of the invention described above.

A further aspect of the invention provides a method of assigning radio resources for device to device, D2D, communication between a first user equipment device and a second user equipment device, the radio resources being used for transmissions to a cellular network entity by a third user equipment device, wherein the radio resources are assigned for the D2D communication taking into account one or more parameters selected from a list comprising:
an order of a modulation scheme of the transmissions by the third user equipment device;
a measurement of transmission channel characteristics with time between third user equipment device and a receiving user equipment device in the D2D communication and
a reception power of a signal of the third user equipment device at a receiving user equipment device in the D2D communication.

This method may be combined with the control aspects of the invention described above.

The invention claimed is:
1. A method of selecting and assigning radio resources for device to device, D2D, communication between a first user equipment device and a second user equipment device, the method comprising:
selecting and assigning the radio resources for D2D communication such that the radio resources to be used for D2D communication are radio resources being used for transmissions to a cellular network entity by a third user equipment device, the selecting further using one or more parameters selected from a list comprising:
an order of a modulation scheme of the transmissions by the third user equipment device;
a measurement of transmission channel characteristics with time between the third user equipment device and a receiving user equipment device in the D2D communication; and
a reception power of a signal of the third user equipment device at a receiving user equipment device in the D2D communication.

2. The method according to claim 1, wherein the radio resources are assigned by the cellular network entity.

3. The method according to claim 1, wherein the radio resources are assigned by one of the first user equipment device and the second user equipment device.

4. The method according to claim 1, wherein a transmission power for device to device, D2D, transmissions between the first user equipment device and the second user equipment device is determined by:
determining a measure of a path loss from the cellular network entity to the first user equipment device, and
using the measure of the path loss to determine a maximum transmission power such that the D2D transmissions are received at the cellular network entity with a signal level around or below a noise level,
wherein the determining of the maximum transmission power includes using a correction value for compensating for a difference between the measured path loss from the cellular network entity to the first user equipment device and a path loss from the first user equipment device to the cellular network entity.

5. The method according to claim 4, wherein the measure of the path loss is determined by comparing a power of a signal received at the first user equipment device with a transmission power of that signal as indicated by the cellular network entity.

6. The method according to claim 5, wherein the maximum transmission power is determined using an equation $$P\_Tx\_D2D\_max = P\_Ref - RSRP + P\_correct - P\_offset$$

where:
- P_Tx_D2D_max is the maximum transmission power;
- P_Ref is a transmit power of downlink reference signals as indicated in system information transmitted by the cellular network entity;
- RSRP is a measured power of the downlink reference signals at the first user equipment device;
- P_correct is the correction value to compensate a path loss difference of uplink versus downlink; and
- P_offset is a power offset value.

7. The method according to claim 4, wherein the correction value is determined by comparing an uplink transmission frequency and a downlink transmission frequency.

8. The method according to claim 4, wherein the first user equipment device derives the correction value and the maximum transmission power autonomously without a need to involve any cellular network entity.

9. The method according to claim 4, wherein the correction value is determined by multiplying a logarithm of a carrier frequency for the D2D transmissions divided by a carrier frequency of transmissions from the cellular network entity to the first user equipment device multiplied by a constant.

* * * * *